April 7, 1936.                G. B. PICKOP                2,036,604
                              BOLT AND NUT
                           Filed Feb. 16, 1935
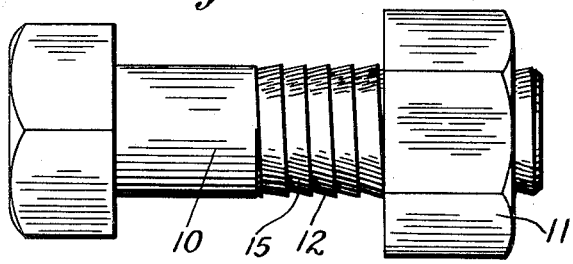
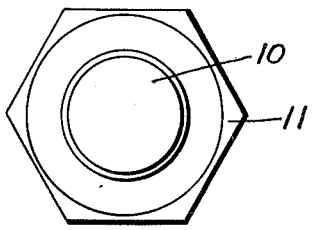
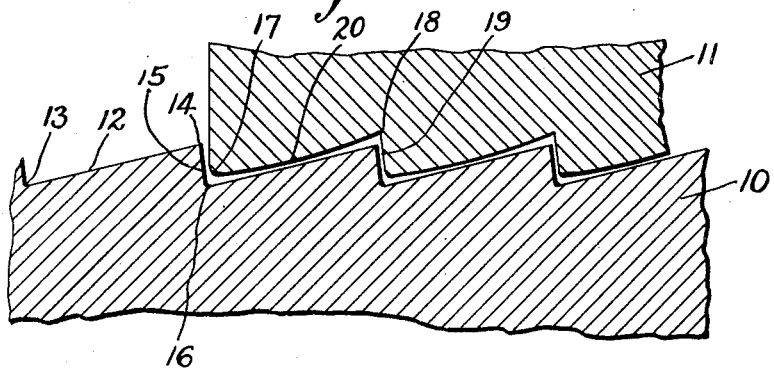
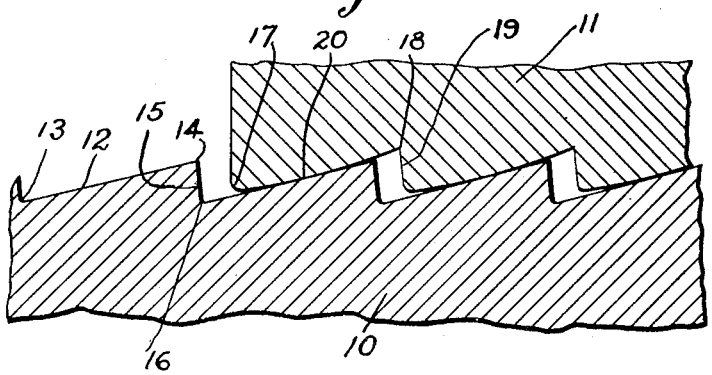
Inventor
George B. Pickop
By Rockwell Bartholow
           Attorneys Patented Apr. 7, 1936

2,036,604

UNITED STATES PATENT OFFICE 2,036,604

BOLT AND NUT

George B. Pickop, New Haven, Conn.

Application February 16, 1935, Serial No. 6,890

8 Claims. (Cl. 151—22)

This application relates to a bolt and nut or like cooperating threaded members, and it is contemplated particularly to provide new and improved cooperating threads or thread surfaces upon the bolt and nut.

In the common form of bolt and nut, the threads are substantially triangular in cross section, each side or face of the thread upon the bolt, for example, projecting upwardly from the body of the bolt to meet in a ridge or helical line. The two side faces of the thread usually make equal or substantially equal angles with the axis of the bolt. While this type of thread has become more or less standard and may be easily produced, it possesses some disadvantages in that the nut is liable to become loosened due to vibration of the parts or wear. There is in such a construction no locking feature; that is, no cooperating parts which serve to lock or bind the nut tightly upon the threads of the bolt when the nut has been set up against the member through which the bolt extends.

One object of the present invention is to provide a bolt and nut or similar threaded cooperating members having a type of thread by means of which the nut will be automatically wedged tightly upon the bolt when in use.

Another object of the invention is to provide cooperating members with engaging thread surfaces of such a nature that these surfaces will be wedged firmly together on a line contact, thus rendering them easily detachable, one from the other, while at the same time providing for a tight holding engagement between the cooperating threads when the members are in use.

A still further object of the invention is the provision of a bolt and nut or like threaded members with cooperating threaded surfaces which will be wedged tightly together when in use, and which threads at the same time will be of relatively shallow depth so that the members in which the threads are cut will be of greater strength.

A still further object of the invention is the provision of a bolt and nut or like threaded members having cooperating threads which make a wedge contact when the nut is set up upon the bolt, and which at the same time will be simple in design and construction and will allow of easy freeing or unscrewing of the nut.

To these and other ends, the invention consists in the novel features and combinations of parts to be hereinafter described and claimed.

In the drawing:

Fig. 1 is a side elevational view of a bolt and nut embodying my invention;

Fig. 2 is an end view of the same;

Fig. 3 is an enlarged fragmentary cross-sectional view of the bolt and nut showing the latter in the "free" position, or position assumed when the nut is being screwed upon the bolt; and Fig. 4 is a view similar to Fig. 3 showing the parts when in locked position, or the position assumed when the nut is set up upon the bolt.

To illustrate a preferred embodiment of my invention, I have shown a conventional bolt 10 and hexagonal nut 11, these parts being provided, however, with a novel form of thread according to the principles of the present invention. It will be understood, however, that the invention is applicable to rods or other cooperating threaded members as well as to bolts and nuts.

As shown in Fig. 3, the bolt is provided with threads of substantially saw-tooth formation in cross section. That is, each tooth is provided with a relatively slightly inclined surface 12 extending, for example, from the base 13 of the tooth to the tip or ridge 14, and an abruptly or sharply inclined surface 15 extending from the ridge 14 to the base 16 of the adjacent tooth. It will be understood that the terms "slightly inclined" and "abruptly inclined" used above refer to inclinations with respect to the axis of the bolt. The surface 15 is almost, and may be substantially, perpendicular to the axis of the bolt. It will be noted that the length of this surface, as shown, represents substantially the depth of the tooth cut in the bolt, and that this depth is relatively shallow as compared to the distance between the points 13 and 14 so that the teeth will be of relatively shallow depth and thus provide for a bolt of greater than ordinary strength.

The thread in the nut cooperates with the thread just described in the bolt and this thread likewise has a relatively long surface 20, shown between the points 17 and 18, to cooperate with the surface 12 of the bolt, and an abrupt shoulder surface or face 19 which lies opposite the surface 15 of the bolt. It will be noted, however, that while the surface 12 on the bolt between the points 13 and 14 is not curved but is a straight inclined surface, the surface of the nut between the points 17 and 18 is (in cross section) formed upon a radius; that is, the line joining the points 17 and 18, as shown in the cross-sectional views in Figs. 3 and 4, is curved and as shown is the arc of a circle. The degree of curvature will of course be relatively small but will nevertheless be sufficient so that this surface between the points 17 and 18 on the nut will not lie flatly upon the surface 12 of the bolt and will not therefore be in contact with the bolt throughout the length of this portion of the thread. As will be explained hereinafter, a line contact instead of a surface contact between these parts will result from this arrangement.

The surface 19 will be substantially parallel to the surface 15 which is, as has been described, substantially at right angles to the axis of the bolt. It will be understood that the thread surfaces upon both bolt and nut are helicoidal in form, as is usual with bolt and nut threads; that is, they extend around the respective members with the desired pitch so as to provide in the usual manner for the leading or threading of the nut upon the bolt when the former is rotated.

In use, the parts will occupy the position shown in Fig. 3 when the nut is being threaded upon the bolt in free or loose condition. It will be seen that the convex surface of the nut thread between the points 17 and 18 will lie opposite the inclined helical surface 12 on the bolt, but there will at this time be no binding or wedging action between these two surfaces, and the nut will turn freely and be led upon the bolt in the customary way. It is also apparent that the nut will have a certain amount of freedom or play longitudinally of the bolt. The movement of the nut toward the head of the bolt in any position is, of course, limited by the engagement of the shoulder surface 15 on the bolt with the shoulder surface 19 on the nut. In the opposite direction or toward the free end of the bolt, the nut will be limited by contact of the convex or arcuate surface 20 between the points 17 and 18 with the surface 12.

As the nut is screwed home upon the bolt, it will of course engage the member through which the bolt is inserted and pressure will be exerted upon continued rotation of the nut tending to force the nut off the end of the bolt or toward the right, as shown in Figs. 3 and 4. This movement will take place until stopped by contact of the surface 20 with the surface 12. The fact that the surface 20 is convex or arcuate in cross-sectional shape will mean that this surface will not contact with the surface 12 throughout their entire lengths but will instead contact along a helical line following substantially the center of the thread surface 12. The surface 20 will tend to wedge or seat itself along this line of contact into the surface 12 due to this line contact between the parts so that there will be a positive limiting of the movement of the nut toward the right, as shown in Fig. 4, until it is securely seated upon the bolt in such a manner that it will not be loosened by vibration or wear. At the same time, also due to the line contact between the parts, the nut may be very readily taken off when turned to the left or in an unscrewing direction as it will quickly free itself from its wedged or seated position when rotated in this direction.

It will be observed that the bolt and nut provided with the threads shown will be extremely simple to manufacture and at the same time will provide bolt and nut parts which will hold together securely and rigidly when in use. At the same time the threads are quite shallow with respect to the bolt so that a comparatively small amount of metal must be cut therefrom, providing a bolt of greater than ordinary strength. Moreover, the curved or convex face on one of the cooperating thread surfaces (the nut thread in the form shown) makes a wedge contact and line contact between the parts which allows of very easy freeing or unlocking of the nut, and a thread of this construction can be used in threads of fine pitch as well as those of coarse pitch.

In the form of my invention shown in Figs. 3 and 4, I have illustrated the surface 20 as the arc of a circle which has its center on a line perpendicular to the corresponding surface 12, or in other words, the surface 12 is substantially tangent to the surface 20. Variations in this particular relation may be resorted to, however, if desired.

It is obvious that the face of the thread on the bolt could be curved and that on the nut plane without departing from the mechanics of the invention.

While I have shown and described a preferred embodiment of my invention, it will be understood that it is not to be limited to all of the details shown, but is capable of modification and variation within the spirit of the invention and within the scope of the appended claims.

What I claim is:

1. A pair of elements having cooperating threads whereby they may be threadedly secured together, said threads having contacting shank surfaces, the said surface of one of said elements being convex in a longitudinal direction, and the cooperating surface of the other element, contacting therewith when the parts are in locked relation, being substantially of zero curvature.

2. A pair of elements provided with cooperating threads by which said elements may be threadedly secured together, said threads being provided with cooperating shank surfaces designed to contact one with the other when the elements are threadedly connected and force is applied thereto in a direction tending to separate them, and said surfaces being so shaped relatively to each other that they touch upon a line contact when so connected, and the surface of one of said elements being inclined at a relatively small angle to the axis of the thread and being substantially plane in longitudinal cross section.

3. A bolt and nut or like cooperating threaded members, said bolt having threads thereon of substantially saw-tooth form with one shank surface of the thread being relatively longer and inclined at a relatively smaller angle to the axis of the bolt than the other shank surface, and facing toward the head of the bolt said nut having cooperating threads formed therein, the surface of the thread on the nut cooperating with said relatively long surface on the bolt being arcuate in cross section to make a line contact with the latter when the nut is screwed home.

4. A bolt and nut or like threaded elements having cooperating threaded surfaces, one of said elements being provided with a helical thread terminating in a ridge and having in cross-sectional form a long straight surface extending from the base to the ridge, said surface facing toward the head of the bolt and being inclined at a slight angle to the axis of the bolt, and said nut having a helical thread to cooperate with that of the bolt, the part of said thread cooperating with the relatively long surface of the nut thread being curved in cross-sectional shape such that an element of the said surface of the bolt is substantially tangent to an element of the surface of the nut.

5. A thread locking device comprising a pair of elements having cooperating helical threads thereon, the thread upon one of said elements having a shank surface substantially plane in a direction transverse to the helix, and the other element having a cooperating shank surface which is curved in a direction transverse to the helix to present a convex surface to the plane surface of the first element, and said surfaces being forced into contact upon application of a force tending to separate the said elements.

6. A bolt and nut having cooperating threaded surfaces, said bolt being provided with a helical thread terminating in a ridge and having a relatively wide surface from the base to the ridge inclined to the axis of the bolt and facing the head of the bolt, the surface upon the opposite side of said ridge being relatively narrow and sharply inclined to the axis of the bolt, said nut having a helical thread to cooperate with that of the bolt, which thread is provided with correspondingly slightly and sharply inclined surfaces, and the slightly inclined surface of one of said members having a cross-sectional shape of a curvature different from that of the other member, whereby said surfaces contact over a part of their areas only.

7. A bolt and nut having cooperating threaded surfaces, the thread upon said bolt comprising a portion facing the bolt head and inclined at a relatively slight angle to the axis of the bolt, and the thread upon said nut having a cooperating portion generally inclined to the axis of the bolt, one of said thread portions having a straight surface in longitudinal cross section, and the other of said thread portions being convexly curved in longitudinal cross section, whereby they contact over a part only of their areas.

8. A bolt and nut having cooperating threaded surfaces, the thread upon said bolt comprising a portion facing the bolt head and inclined at a relatively slight angle to the axis of the bolt, the thread upon said nut having a cooperating portion generally inclined to the axis of the bolt, and one of said thread portions having a curved surface in longitudinal cross section and being of a different curvature from that of the other thread portion, whereby the thread portions contact over a part only of their areas.

GEORGE B. PICKOP.